(12) United States Patent
Infanti

(10) Patent No.: US 12,395,699 B2
(45) Date of Patent: Aug. 19, 2025

(54) SYSTEM AND METHOD FOR RECOMMENDING MEDIA CONTENT BASED ON USER MOOD

(71) Applicant: ECLAPPER PROJECT INC., Dover, DE (US)

(72) Inventor: David Infanti, Dover, DE (US)

(73) Assignee: eClapper Project Inc., Dover, DE (US)

(*) Notice: Subject to any disclaimer, the term of this patent is extended or adjusted under 35 U.S.C. 154(b) by 0 days.

(21) Appl. No.: 18/536,430

(22) Filed: Dec. 12, 2023

(65) Prior Publication Data

US 2024/0114204 A1 Apr. 4, 2024

Related U.S. Application Data

(63) Continuation-in-part of application No. 18/453,047, filed on Aug. 21, 2023, now abandoned.

(60) Provisional application No. 63/366,720, filed on Jun. 21, 2022.

(51) Int. Cl.
*H04N 21/442* (2011.01)
*H04N 21/466* (2011.01)

(52) U.S. Cl.
CPC ... *H04N 21/44218* (2013.01); *H04N 21/4668* (2013.01)

(58) Field of Classification Search
None
See application file for complete search history.

(56) References Cited

U.S. PATENT DOCUMENTS

| | | | |
|---|---|---|---|
| 7,689,556 B2 | 3/2010 | Garg et al. | |
| 7,698,300 B2 | 4/2010 | Yamamoto | |
| 8,704,760 B2 | 4/2014 | Kang et al. | |
| 9,009,773 B1* | 4/2015 | Hendricks | H04N 21/4184 725/89 |
| 9,681,166 B2 | 6/2017 | Naveh | |
| 9,729,921 B2 | 8/2017 | Kim et al. | |
| 10,038,929 B1 | 7/2018 | Thomas et al. | |
| 10,285,634 B2 | 5/2019 | Jain et al. | |
| 10,373,230 B2 | 8/2019 | Walti et al. | |
| 10,552,479 B2 | 2/2020 | Modi | |
| 10,874,309 B2 | 12/2020 | Khwaja et al. | |
| 11,451,870 B1* | 9/2022 | Panchaksharaiah | H04N 21/4666 |
| 2009/0226046 A1 | 9/2009 | Shteyn | |
| 2012/0066059 A1 | 3/2012 | Berger | |
| 2012/0117071 A1 | 5/2012 | Sakamoto et al. | |
| 2012/0124456 A1* | 5/2012 | Perez | H04N 21/44218 715/200 |
| 2013/0014223 A1* | 1/2013 | Bhatia | H04H 60/31 726/4 |

(Continued)

*Primary Examiner* — Junior O Mendoza
(74) *Attorney, Agent, or Firm* — Dunlap Bennett & Ludwig, PLLC; Anna L. Kinney

(57) ABSTRACT

A method for recommending one or more media content to a user includes transmitting one or more questions to a user device associated with the user and obtaining responses to the questions from the user device. The method further includes determining a user mood score based on the responses and correlating the user mood score with multiple content mood scores associated with a multiple media content. The method additionally includes determining the media content to be recommended to the user based on the correlation, and transmitting information associated with the recommended media content to the user device.

18 Claims, 5 Drawing Sheets

(56) References Cited

U.S. PATENT DOCUMENTS

| | | | |
|---|---|---|---|
| 2014/0228701 A1 | 8/2014 | Chizeck et al. | |
| 2014/0298364 A1* | 10/2014 | Stepanov | H04N 21/4668 725/10 |
| 2014/0380359 A1* | 12/2014 | Musil | H04N 21/6582 725/34 |
| 2015/0281783 A1 | 10/2015 | Laksono et al. | |
| 2016/0182955 A1 | 6/2016 | Klappert et al. | |
| 2018/0075490 A1 | 3/2018 | Chintalapoodi et al. | |
| 2018/0324490 A1 | 11/2018 | Anderson et al. | |
| 2019/0012930 A1* | 1/2019 | McAlister | G16H 80/00 |
| 2019/0066679 A1 | 2/2019 | Mao et al. | |
| 2020/0304863 A1 | 9/2020 | Domm et al. | |
| 2020/0342648 A1 | 10/2020 | Shimizu et al. | |
| 2022/0150582 A1* | 5/2022 | Nishimura | H04N 21/4668 |

* cited by examiner

SYSTEM AND METHOD FOR RECOMMENDING MEDIA CONTENT BASED ON USER MOOD

CROSS-REFERENCE TO RELATED APPLICATION

This application is a continuation-in-part of U.S. nonprovisional application Ser. No. 18/453,047, filed Aug. 21, 2023, which claims priority to and the benefit of U.S. provisional application No. 63/366,720, filed Jun. 21, 2022. The disclosures of both U.S. application Ser. No. 18/453,047 and U.S. application No. 63/366,720 are hereby incorporated by reference herein in their entireties.

BACKGROUND OF THE INVENTION

Field of the Invention

The present invention generally relates to a system and method for recommending media content from a streaming platform, and more particularly to a system and method for recommending media content from online streaming platforms based on viewer's mood.

Description of the Related Art

Due to availability of a large number of TV streaming offers and options, viewers waste much more time looking or searching for programming content to view, rather than watching the programming content that they may really prefer to watch.

Existing media content recommendation systems recommend media content to users based on their historical viewing choices; however, such conventional systems do not factor-in user's current state.

Therefore, a recommendation system is required that recommends media content to users based on viewer's current state.

SUMMARY OF THE INVENTION

The following presents a simplified summary of the present disclosure in a simplified form as a prelude to the more detailed description that is presented herein.

In accordance with embodiments of the invention, there is provided a method for recommending one or more media content to a user. The method includes transmitting, by a processor, one or more questions to a user device associated with the user. The method further includes obtaining, by the processor, one or more responses associated with the questions from the user device, responsive to transmitting the questions. Further, the method includes determining, by the processor, a user mood score based on the responses. Furthermore, the method includes correlating, by the processor, the user mood score with a plurality of content mood scores associated with a plurality of media content. Additionally, the method includes determining, by the processor, the media content to be recommended to the user based on the correlation. The method further includes transmitting, by the processor, information associated with the recommended media content to the user device.

In some aspects, the processor transmits three questions to the user device. Further, the questions are at least one of a picture question, a color palette question, a text question, an audio question and a video question.

In some aspects, the information associated with the recommended media content includes media content metadata and instructions to purchase or rent the media content. Further, the media content is at least one of television series, movies, music, books, and video games.

In some aspects, the method may further include authenticating the user and/or the user device, and transmitting the questions to the user device responsive to authenticating the user and/or the user device.

In accordance with another embodiment of the invention, there is provided a system for recommending one or more media content to a user. The system includes a transceiver configured to transmit one or more questions to a user device associated with the user, and receive one or more responses associated with the questions from the user device, responsive to transmitting the questions. The system further includes a processor communicatively coupled with the transceiver. The processor is configured to obtain the responses from the transceiver, and determine a user mood score based on the responses. The processor is further configured to correlate the user mood score with a plurality of content mood scores associated with a plurality of media content, and determine the media content to be recommended to the user based on the correlation. Furthermore, the processor is configured to transmit information associated with the media content to the user device.

In some aspects, the processor is further configured to authenticate the user and/or the user device, and cause the transceiver to transmit the questions to the user device responsive to authenticating the user and/or the user device.

The present disclosure discloses a system and method for recommending media content to a user based on user's mood. Conventional media content recommendations are based on purely random selection or choices that may be based on user's past programming or media content choices. Frequently, a user's preferred programming content may vary considerably based upon user's mood at a given viewing instance. The system and method disclosed in the present disclosure recommends media content to the user based on user's mood, thereby enriching and enhancing user's content viewing experience.

These and other features, aspects, and advantages of the present invention will become better understood with reference to the following description and appended claims.

BRIEF DESCRIPTION OF THE DRAWINGS

Illustrative embodiments of the present invention are described herein with reference to the accompanying drawings, in which.

DETAILED DESCRIPTION OF INVENTION

Figure 1:
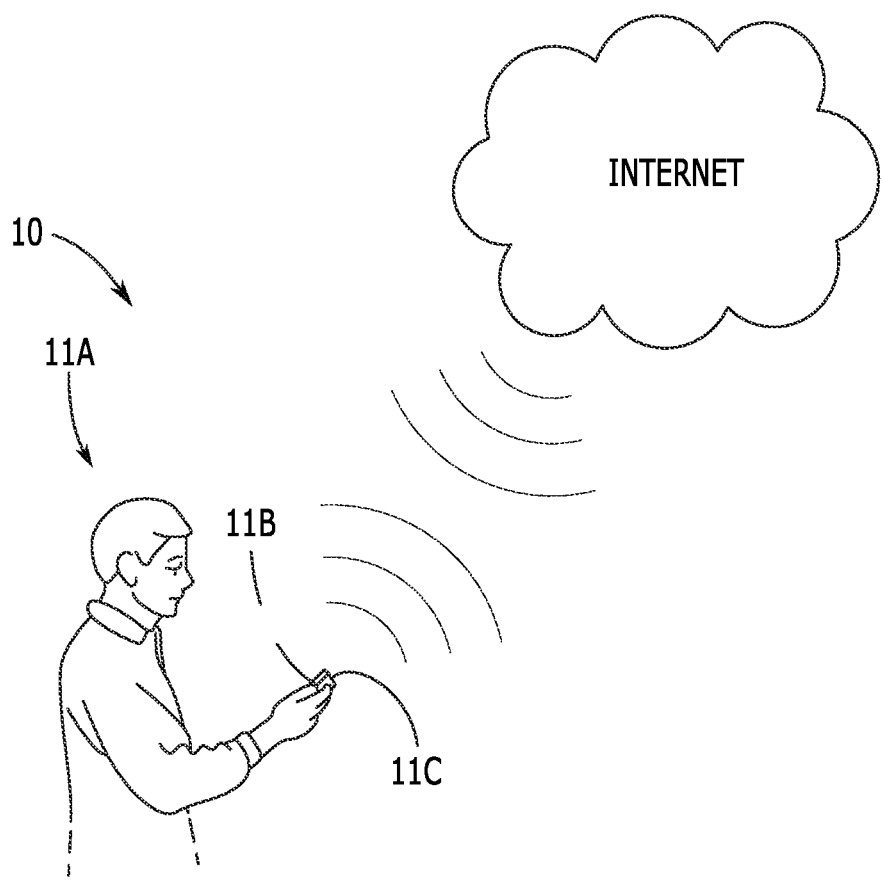
FIG. 1 depicts an example environment in which techniques and structures for providing the systems and methods disclosed herein may be implemented.

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent herein. It is to be understood, however, that the present invention may be embodied in various forms. Therefore, persons of ordinary skill in the art will realize that the following disclosure is illustrative only and not in any way limiting, as the specific details disclosed herein provide a basis for the claims and a representative basis for teaching to employ the present invention in virtually any appropriately detailed system, structure or manner. It should be understood that the devices, materials, methods, procedures, and techniques described herein are presently representative of various embodiments. Other embodiments of the disclosure will readily suggest themselves to such skilled persons having the benefit of this disclosure.

Reference will now be made in detail to the present preferred embodiments of the invention, examples of which are illustrated in the accompanying drawings. Wherever possible, the same reference numerals are used in the drawings and the description to refer to the same or like parts.

FIG. 1 depicts an example environment 10 in which techniques and structures for providing the systems and methods disclosed herein may be implemented. While describing FIG. 1, references will be made to FIG. 2, which depicts a block diagram of an example content recommendation system 200 (or system 200). The system 200 may be hosted on a server (not shown).

The environment 10 may include a user 11A accessing an application 11B on a user device 11C. The application 11B may be associated with the system 200, and the user 11A may be accessing the system 200/application 11B via the user device 11C and a wireless communication network. In some aspects, the user device 11C may be communicatively connected with the system 200 via the wireless communication network, which may include, for example, the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), Fifth Generation (5G), etc.

In some aspects, the user device 11C may be, for example, a smart phone, a tablet, a smart television, a smart extended reality (XR) headset, a smart watch, or any other wearable or Internet of Things (IoT) device.

In some aspects, the user 11A may be accessing the system 200/application 11B to seek recommendation of media content to watch, and to select and view/play the recommended media content. The media content may be, for example, television series, movies, music, video games, and/or the like.

The system 200 may be configured to determine user's mood via the application 11B, and recommend one or more media content to watch to the user 11A based on the user's mood. In some aspects, as shown in FIG. 2, the system 200 may include a processor 202, a memory 204 and a transceiver 206, which may be communicatively coupled with each other.

The transceiver 206 may be configured to transmit or receive information/data to or from external systems and devices, e.g., the user device 11C or external databases/servers (not shown). In some aspects, the external databases/servers may be communicatively coupled with the system 200, and configured to store and provide a plurality of media content and associated metadata (e.g., media content name, duration, artist name, genre, tag, media content mood scores, etc.) to the system 200 via the transceiver 206.

Figure 2:
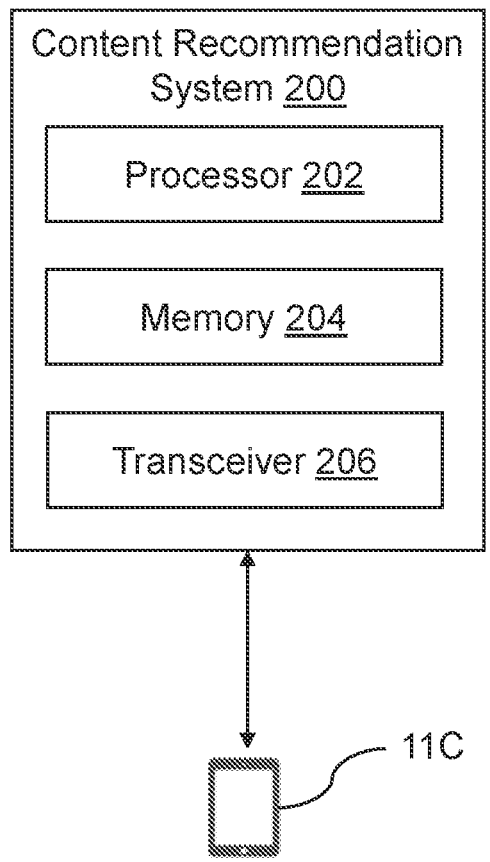
FIG. 2 depicts a block diagram of an example content recommendation system in accordance with embodiments of the invention.

The processor 202 may be disposed in communication with one or more memory devices disposed in communication with the respective computing systems (e.g., the memory 204 and/or one or more external databases not shown in FIG. 2). The processor 202 may utilize the memory 204 to store programs in code and/or to store data for performing aspects in accordance with the disclosure. The memory 204 may be a non-transitory computer-readable storage medium or memory storing a program code that enables the processor 202 to perform operations in accordance with the present disclosure. The memory 204 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In operation, when the user 11A desires to obtain information associated with recommended media content and/or view/play the media content, the user 11A may access the application 11B on the user device 11C. In some aspects, to access the application 11B, the user 11A may input login or sign in details on the user device 11C, and/or may access the application 11B via user's one or more social networking accounts.

Responsive to the user 11A adding the login or sign in details on the user device 11C, the user device 11C may transmit the login or sign in details to the transceiver 206. The processor 202 may then authenticate the user 11A and/or the user device 11C based on the login or sign in details. Specifically, the processor 202 may match the received login or sign in details with user's pre-stored login or authentication details (that may be stored in the memory 204), and may authenticate the user 11A and/or the user device 11C when the details match.

Responsive to authenticating the user 11A and/or the user device 11C, the processor 202 may transmit, via the transceiver 206, one or more questions to the user device 11C to be displayed/outputted to the user 11A via the application 11B. In an exemplary aspect, the processor 202 may transmit three questions. Further, the transmitted questions may include a picture question, a color palette question, a text question, an audio question and/or a video question.

Responsive to viewing/hearing the questions, the user 11A may respond to the questions. In some aspects, the responses to the questions may be in the form of audio commands and/or typed/written responses on the user device 11C. The user device 11C may transmit the responses to the transceiver 206, which may transmit the responses to the processor 202.

The processor 202 may obtain the responses to the questions from the transceiver 206, and determine a user mood score based on the obtained responses. In an exemplary aspect, each potential response to a question may have an associated mood score indicating whether the user 11A may be sad, happy, excited, bored, adventurous, and/or the like. Responsive to obtaining the responses from the user 11A, the processor 202 may calculate an average of the mood scores of all the responses to determine the "user mood score" described above.

The processor 202 may then fetch mood scores associated with a plurality of media content (and associated metadata) from the external databases/servers, which may be pre-assigned using Natural Language Processing. The processor 202 may then correlate the user mood score with the fetched mood scores associated with the plurality of media content to determine one or more media content, from the plurality of media content, which may be recommended to the user 11A based on the correlation. For example, the processor 202 may determine those media content to be recommended to the user 11A that have their associated mood scores close to (e.g., within a predefined threshold difference of) the user mood score.

Responsive to determining the media content to recommend to the user 11A, the processor 202 may transmit, via the transceiver 206, information associated with the media content to the user device 11C. The information associated with the media content may include the metadata associated with the recommended media content, instructions to purchase or rent the media content, and/or the like.

The user 11A may view/hear the information associated with the media content, and may accordingly purchase/rent the media content for viewing or playing. In this manner, the system 200 assists in recommending media content to the user 11A based on the user's mood.

In some aspects, the application 11B may also be accessible via a smart TV remote, and be compatible with smart TVs, equipped with a surface and touch screen. The application 11B may also have a mood detector that detects from voice characteristics of the user 11A, the user's mood and finds the perfect match with movie, TV series, music, and video games.

Figure 3:
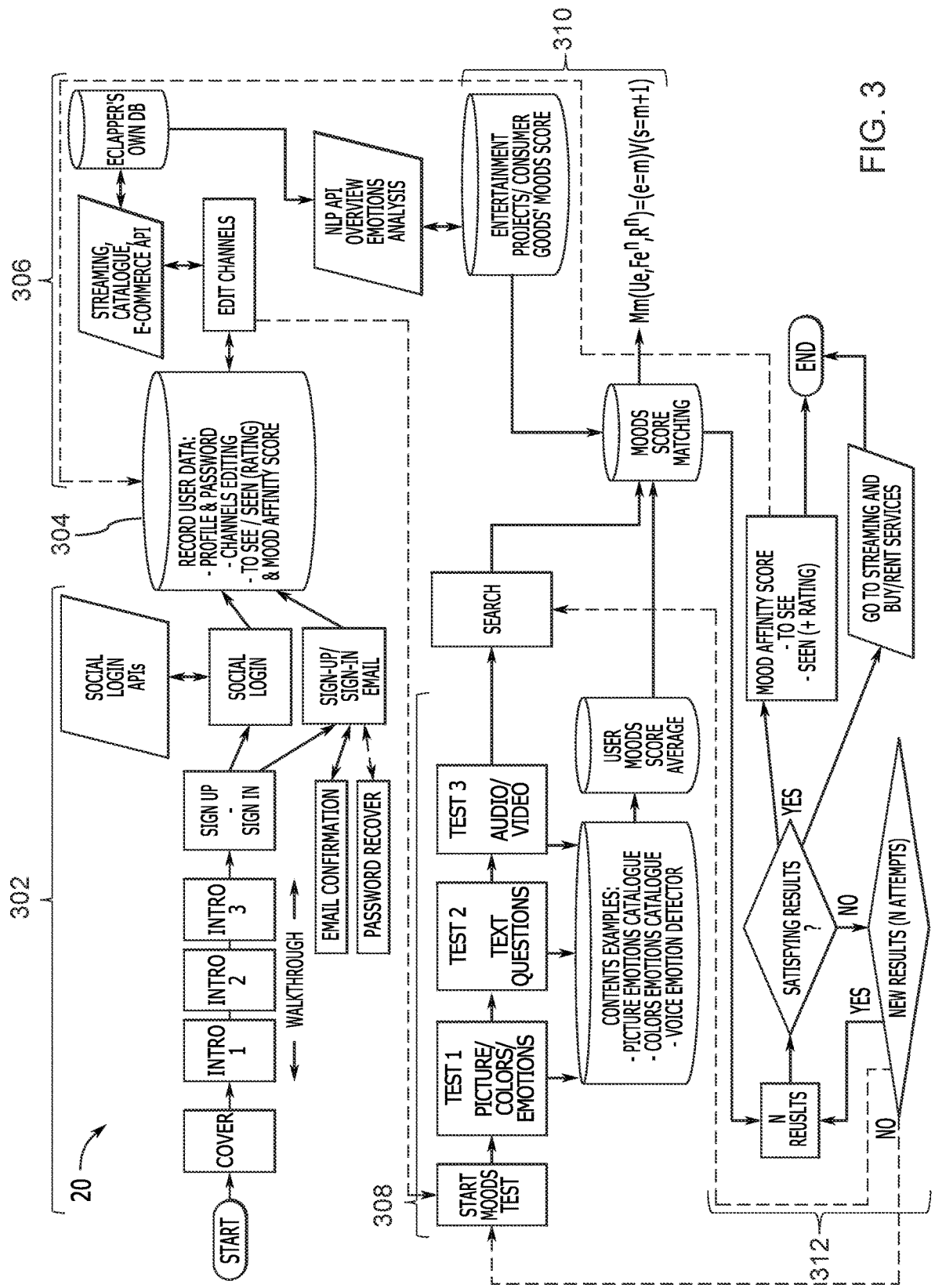
FIG. 3 depicts a flow diagram of an example first method for recommending media content to a user in accordance with embodiments of the invention.

FIG. 3 depicts a flow diagram of an example first method 20 for recommending media content to the user 11A in accordance with embodiments of the invention. The method 20 is specifically associated with steps performed by the system 200 for finding suitable entertainment (e.g., movies, television shows, music, books, video games, general consumer goods, etc.) on streaming and e-commerce platforms, and physical retail.

At steps collectively shown as steps 302 in FIG. 3, the user 11A may access the application 11B by following the walkthrough instructions provided by the system 200 and signing-in using user's social networking account (connected to a social networking API), email address and/or password.

Responsive to the user 11A accessing the application 11B, the system 200 may store user's data, including user's login details, password, etc. in the memory 204, as shown by a step 304 in FIG. 3. The memory 204 is also used to store user's media content viewing history, user's ratings to one or more viewed media content, mood affinity score, and/or the like. The memory 204 may further be connected with streaming, catalogue, e-commerce platforms' APIs, and configured to receive media content and/or associated metadata and mood scores from the APIs, as shown in section 306 of FIG. 3.

The system 200 may then commence the mood test of the user 11A, where the system 200 transmits three questions to the user device 11C, as shown by steps 308 in FIG. 3. In an exemplary aspect, the questions may be from picture emotions catalogue, colors emotions catalogue and/or voice emotion catalogue.

The system 200 may then calculate the user's mood score (or the mood score average), as described above in conjunction with FIG. 2 and as shown in FIG. 3. The system 200 may then search for the plurality of media content, fetch their entertainment product/consumer good's mood score, and match the fetched score with the user's mood score, as shown by steps 310 in FIG. 3 and as described above in conjunction with FIG. 2. In an exemplary aspect, the mathematical expression associated with the mood score matching is: $Mm(Ue, Fe'', R'')=(e=m)V(s=m+l)$, where Ue is user's mood or emotion score and Fe is film's mood or emotion score.

Thereafter, the system 200 may determine and recommend one or more media content/entertainment products to the user 11A based on the mood score matching, as shown in steps 312 of FIG. 3 and as described above in conjunction with FIG. 2. In some aspects, those media content may be recommended that the user 11A may not have already seen. If the user 11A may not be satisfied with the recommended results/media content, the system 200 may recommend more results in the same manner as described above.

On the other hand, if the user 11A may be satisfied with the results, the user 11A may rent or purchase the media content/entertainment product. Further, the memory 204 may store the mood affinity score of the media content/entertainment product selected/purchased/rented by the user 11A and/or the rating provided by the user 11A to the content.

Figure 4:
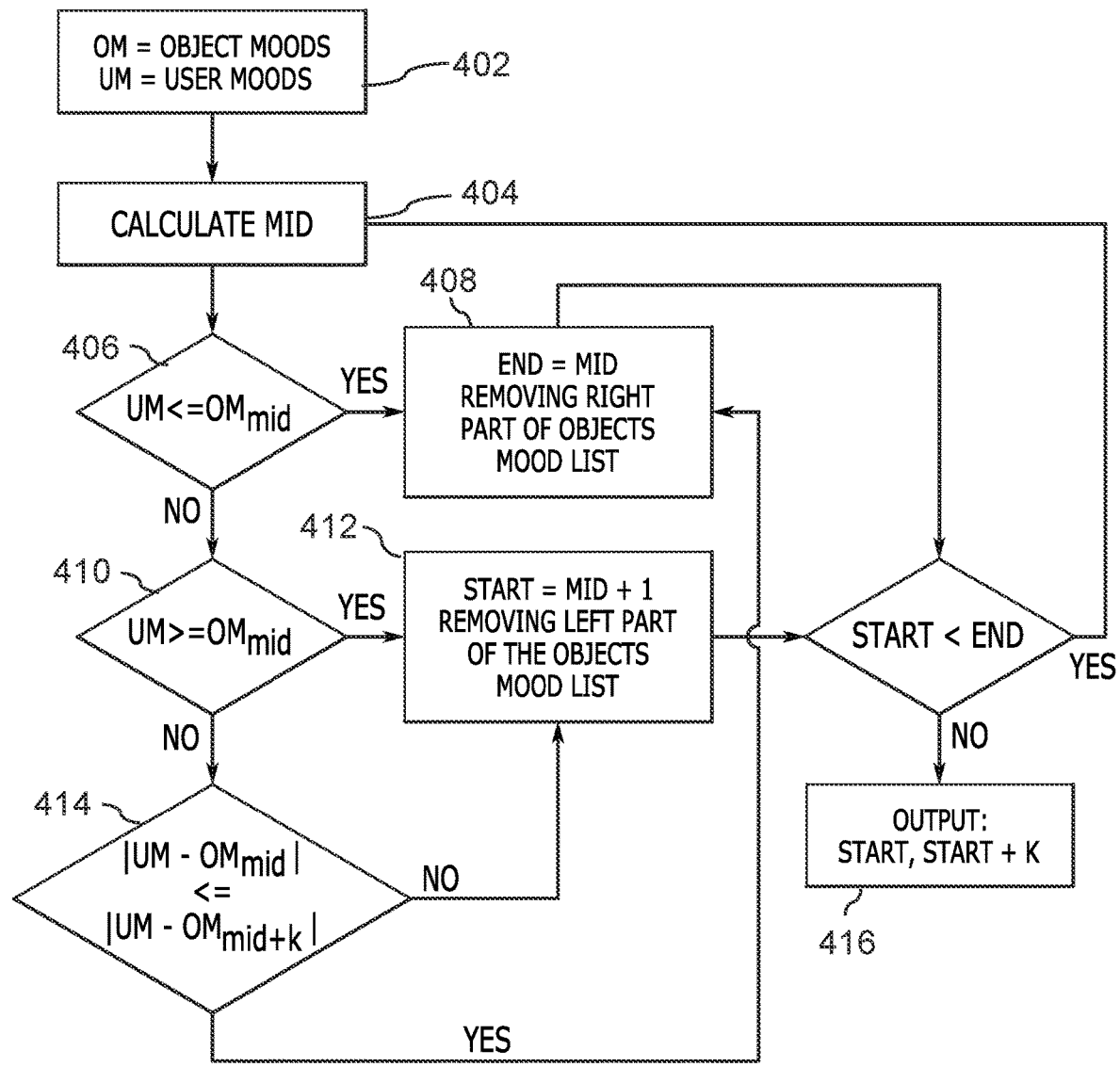
FIG. 4 depicts a flow diagram of an example second method for recommending media content to a user in accordance with embodiments of the invention.

FIG. 4 depicts a flow diagram of an example second method 30 for recommending media content to the user 11A in accordance with embodiments of the invention. At step 402, the system 200 may obtain the object or media content mood scores "OM" and user's mood score "UM". At step 404, the system 200 may calculate or determine mid of the list of the plurality of media content.

At step 406, the system 200 may determine whether UM is less than or equal to the mid of OM "$OM_{mid}$". If UM is less than or equal to the mid of OM, then at step 408, the method 30 ends and the list of media content to the right of the mid is removed, and remaining results are output to the user 11A at step 416.

On the other hand, if UM is greater than or equal to the mid of OM, as determined at step 410, then at step 412, the method 30 ends and the list of media content to the left of the mid is removed, and remaining results are output to the user 11A at step 416.

At step 414, if it is determined that a difference between UM and $OM_{mid}$ is less than or equal to a difference between UM and $OM_{mid+k}$, then the method 30 moves to the step 408; otherwise, the method 30 moves to the step 412.

Figure 5:
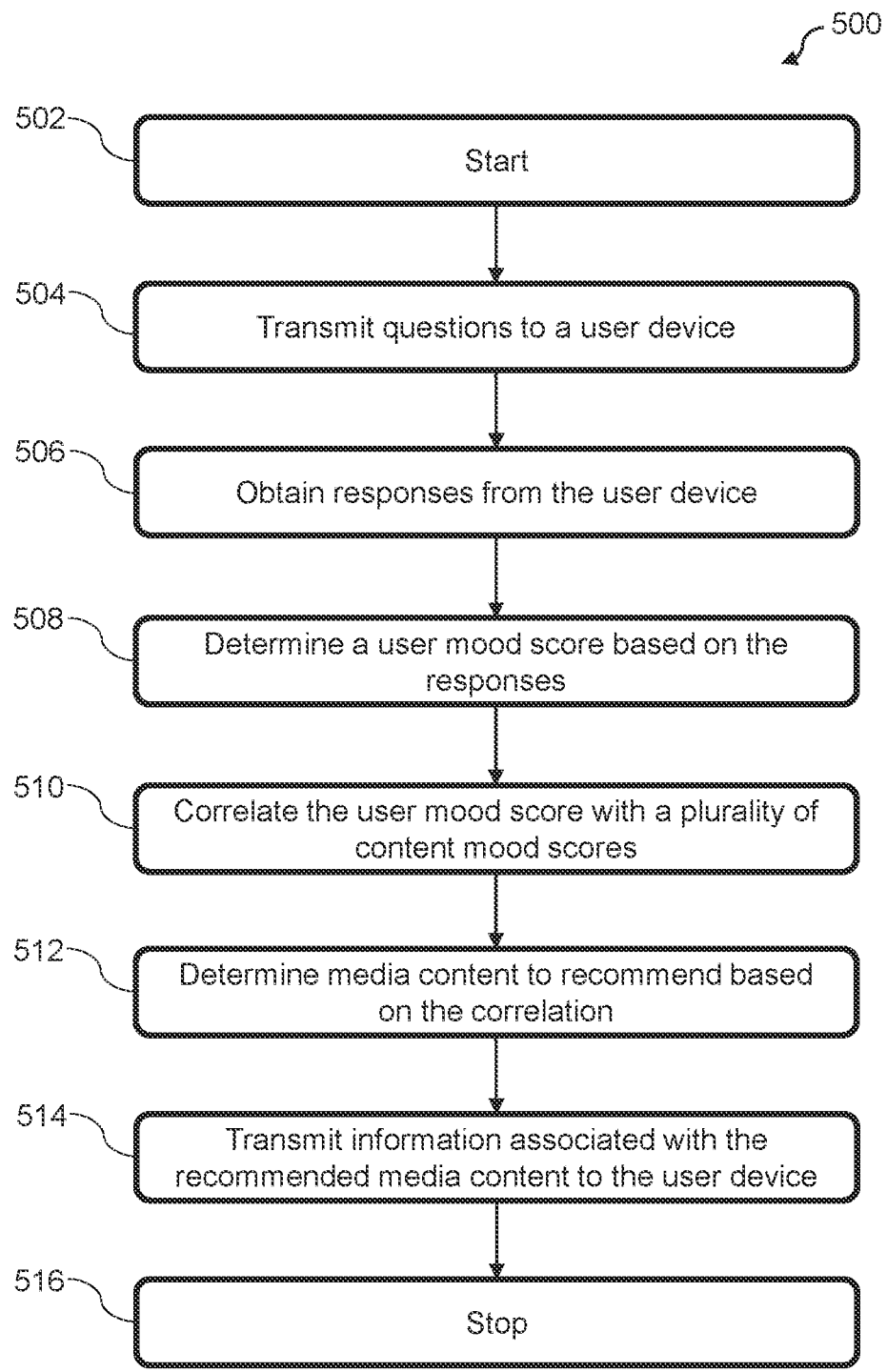
FIG. 5 depicts a flow diagram of an example third method for recommending media content to a user in accordance with embodiments of the invention.

FIG. 5 depicts a flow diagram of an example third method 500 for recommending media content to the user 11A in accordance with embodiments of the invention. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include transmitting, by the processor 202, the questions to the user device 11C. At step 506, the method 500 may include obtaining, by the processor 202, the responses to the questions from the user 11A via the user device 11C. At step 508, the method 500 may include determining, by the processor 202, the user mood score based on the responses. At step 510, the method 500 may include correlating, by the processor 202, the user mood score with the plurality of mood scores associated with the plurality of media content.

At step 512, the method 500 may include determining, by the processor 202, one or more media content to be recommended to the user 11A based on the correlation. At step 514, the method 500 may include transmitting, by the processor 202, information associated with the recommended media content to the user device 11C.

At step 516, the method 500 ends.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation within the spirit and scope of the appended claims.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

What is claimed is:

1. A method for recommending one or more media content to a user, the method comprising:
    transmitting, by a processor, one or more questions to a user device associated with the user;
    obtaining, by the processor, one or more responses associated with the one or more questions from the user device, responsive to transmitting the one or more questions;
    detecting, by the processor, emotion from a voice characteristic of the user;
    determining, by the processor, a user mood score based on the one or more responses and the detected emotion of the voice characteristic of the user;
    correlating, by the processor, the user mood score with a plurality of content mood scores associated with a plurality of media content;
    determining, by the processor, the one or more media content to be recommended to the user based on the correlation; and
    transmitting, by the processor, information associated with the one or more media content to the user device;
    wherein correlating the user mood score with the plurality of content mood scores comprises applying a mathematical expression $Mm(Ue, Fe'', R'') = (e=m)v(s=m+1)$, where Mm is mood matching, Ue is the user mood score, Fe is a content mood score, n is a number of entries, R is a refined mood score list, s is a start index, m is a midpoint, e is an end index, and V is a logical OR operator.

2. The method of claim 1, wherein transmitting the one or more questions comprises transmitting three questions.

3. The method of claim 1, wherein the one or more questions comprises at least one of a picture question, a color palette question, a text question, an audio question and a video question.

4. The method of claim 1, wherein the information associated with the one or more media content comprises instructions to purchase or rent the one or more media content.

5. The method of claim 1, wherein the one or more media content is at least one of television series, movies, music and video games.

6. The method of claim 1 further comprising:
    authenticating at least one of the user and the user device; and
    transmitting the one or more questions to the user device responsive to authenticating the at least one of the user and the user device.

7. The method of claim 1, further comprising storing user data including login details and password in a memory upon user authentication, wherein the user data is accessed during subsequent user sessions.

8. The method of claim 1, further comprising storing, in a memory, a media content viewing history for the user, user ratings of previously viewed media content, and mood affinity scores.

9. The method of claim 1, further comprising connecting with external streaming, catalogue, and e-commerce platforms via application programming interfaces (APIs), and receiving media content metadata and mood scores from the APIs, wherein the mood scores are pre-assigned using Natural Language Processing.

10. The method of claim 1, wherein determining the user mood score comprises calculating an average of individual mood scores associated with each of the one or more responses, and wherein the individual mood scores are operative to indicate an emotional state of the user.

11. The method of claim 1, further comprising determining whether the user is satisfied with the recommended media content, and when the user is not satisfied with the recommended media content, recommending additional media content.

12. The method of claim 1, further comprising storing, in a memory, a mood affinity score of media content selected, purchased, or rented by the user and/or a rating provided by the user to the selected, purchased, or rented media content.

13. The method of claim 1, wherein the one or more questions are selected from a picture emotions catalogue, a colors emotions catalogue, and/or a voice emotion catalogue.

14. The method of claim 1, further comprising enabling user access via a social networking application programming interface (API), wherein the user signs-in using the social networking account connected to the social networking API, email address, and/or password.

15. A system for recommending one or more media content to a user, the system comprising:
    a transceiver configured to:
        transmit one or more questions to a user device associated with the user; and
        receive one or more responses associated with the one or more questions from the user device, responsive to transmitting the one or more questions; and a processor communicatively coupled with the transceiver, wherein the processor is configured to:

obtain the one or more responses from the transceiver;

detect emotion from a voice characteristic of the user;

determine a user mood score based on the one or more responses and the detected emotion of the voice characteristic of the user;

correlate the user mood score with a plurality of content mood scores associated with a plurality of media content;

determine the one or more media content to be recommended to the user based on the correlation; and transmit information associated with the one or more media content to the user device;

wherein correlating the user mood score with the plurality of content mood scores comprises applying a mathematical expression $Mm(Ue, Fe'', R'') = (e=m) v (s=m+1)$, where Mm is mood matching, Ue is the user mood score, Fe is a content mood score, n is a number of entries, R is a refined mood score list, s is a start index, m is a midpoint, e is an end index, and V is a logical OR operator.

16. The system of claim 15, wherein the one or more questions comprises at least one of a picture question, a color palette question, a text question, an audio question and a video question.

17. The system of claim 15, wherein the one or more media content is at least one of television series, movies, music and video games.

18. The system of claim 15, wherein the processor is further configured to:

authenticate at least one of the user and the user device; and cause the transceiver to transmit the one or more questions to the user device responsive to authenticating the at least one of the user and the user device.

* * * * *